United States Patent
Liu et al.

(10) Patent No.: US 12,258,233 B2
(45) Date of Patent: Mar. 25, 2025

(54) ADJUSTABLE PAPER BLOCKING STRUCTURE OF THERMAL PRINTERS

(71) Applicant: Wuhan Jingchen Intelligent Identification Technology Co., Ltd., Wuhan (CN)

(72) Inventors: Xiong Liu, Hanchuan (CN); MingMeng Li, Wuhan (CN)

(73) Assignee: Wuhan Jingchen Intelligent Identification Technology Co, Ltd., Wuhan (CN)

( * ) Notice: Subject to any disclaimer, the term of this patent is extended or adjusted under 35 U.S.C. 154(b) by 167 days.

(21) Appl. No.: 18/317,375

(22) Filed: May 15, 2023

(65) Prior Publication Data

US 2024/0308802 A1  Sep. 19, 2024

(30) Foreign Application Priority Data

Mar. 15, 2023 (CN) .......................... 202310250754.1

(51) Int. Cl.
*B65H 16/06* (2006.01)
*B41J 11/00* (2006.01)

(52) U.S. Cl.
CPC .......... *B65H 16/06* (2013.01); *B41J 11/0045* (2013.01); *B65H 2403/411* (2013.01)

(58) Field of Classification Search
CPC ............ B65H 19/126; B65H 2403/411; B41J 11/0045; B41J 11/0025; B41J 11/62; B41J 2/32
See application file for complete search history.

(56) References Cited

U.S. PATENT DOCUMENTS

| 8,925,854 | B2 * | 1/2015 | Chen ...................... | B65H 16/06 242/578.1 |
| 2003/0170065 | A1 * | 9/2003 | Kim ....................... | B41J 15/042 400/718 |
| 2009/0114758 | A1 * | 5/2009 | Yamada ............... | B41J 11/0025 242/566 |

* cited by examiner

*Primary Examiner* — Jennifer Bahls
(74) *Attorney, Agent, or Firm* — Daniel A. Blasiole; DeWitt LLP (57) ABSTRACT

Disclosed is an adjustable paper blocking structure of a thermal printer, comprising: a base evenly provided with a plurality of tooth grooves; a paper blocking component slidably connected to the base and used to limit the two ends of label paper in the middle of the paper tray of the desktop thermal printer, and a locking component having one end rotatably connected to the paper blocking component and the other end engaging with the tooth groove. The proposed adjustable paper blocking structure of a thermal printer can be used for label papers of different sizes and improves printing accuracy.

10 Claims, 6 Drawing Sheets

ADJUSTABLE PAPER BLOCKING STRUCTURE OF THERMAL PRINTERS

CROSS-REFERENCE TO RELATED APPLICATIONS

This application claims priority to Chinese Invention Application No. 202310250754.1, filed on Mar. 15, 2023, which of title is "An adjustable paper blocking structure of a thermal printer". The disclosure of the application is incorporated herein for all purposes by reference in its entirety.

TECHNICAL FIELD

The present application relates to the technical field of thermal printing, in particular to an adjustable paper blocking structure of thermal printers.

BACKGROUND ART

A thermal printer is a portable printer equipped with a semiconductor heating element installed on the printing head, and the printing head is heated and contacts with the thermal paper to print out the required pattern. The principle is similar to that of a thermal fax machine. Images are generated by heating and chemical reactions in the film, which can be stored for several years at room temperature. The thermal printing has the advantages of high speed, low noise, and convenient use.

Currently, most thermal printers on the market are only suitable for specific sizes of label paper. When printing on other sizes of label paper, the placement position of the label paper in the paper tray is prone to deviation, resulting in low printing accuracy. For example, the existing technology disclosed in JPWO2019138490A1 presents a thermal printer with a convenient paper loading and conveying mechanism. The thermal printer includes a thermal head, a paper pressing roller arranged opposite to the thermal head and clamping the paper between them, an outer shell with a paper pressing roller, and a thermal head. The first outer shell can be connected or separated from the second outer shell, and it separates the front end of the paper from the rolled-up state of the paper, guiding the paper in the direction of the paper pressing roller. The guide for separating the front end of the paper and the clamping portion of the paper are in the same direction as the paper pressing roller. The thermal printer further includes a feed roller for paper transportation and a paper stopper for blocking the paper transportation channel when the first outer shell separates from the second outer shell. However, this thermal printer is only suitable for specific sizes of label paper. When using other sizes of label paper, the paper feeding mechanism still transports the paper along the original trajectory, and the relative position of label papers of different sizes in the paper tray is not the same, and none of them can be transported to the middle position of the paper tray, resulting in position deviation of the label paper during printing, which reduces printing accuracy.

Technical Solution

In response to the problems in the existing technology, the present application proposes an adjustable paper blocking structure of a thermal printer to address the issues of the existing thermal printer being unable to adapt to different sizes of label paper and low printing accuracy.

To achieve the above technical objectives, the technical solutions proposed by the present application are as follows:
an adjustable paper blocking structure of a thermal printer is provided, which includes:
a base evenly provided with a plurality of tooth grooves;
a paper blocking component comprising a first paper blocking plate and a second paper blocking plate, wherein the first paper blocking plate and the second paper blocking plate are mirror-symmetrically arranged on the base and slidably connected to the base;
a locking component having one end rotatably connected to the first paper blocking plate and the other end engaged in the corresponding tooth groove;
wherein the base is provided with a first slot and a second slot, and a bottom end of the first paper blocking plate and a bottom end of the second paper blocking plate are respectively provided with a first rack and a second rack, the first rack and the second rack pass through the first slot and the second slot respectively and are engaged by a ratchet, the ratchet is rotatably attached to the base;
wherein the locking component comprises a rotating handle, a pin, and a reset spring, a bottom end of the pin passes through the bottom end of the first paper blocking plate and is slidably connected to the tooth groove, a top end of the pin passes through a top end of the first paper blocking plate and is rotatably connected to the rotating handle, a middle of the pin is fitted with the reset spring, and a top end of the reset spring is connected to a bottom surface of the first paper blocking plate and a bottom end of the reset spring is connected to a side wall of the pin.

Optionally, a first convex platform and a second convex platform are provided in a middle of an inner wall of the first paper blocking plate and in a middle of an inner wall of the second paper blocking plate, respectively.

Optionally, a lower side of the inner wall of the first paper blocking plate and a lower side of the inner wall of the second paper blocking plate are provided with an receiving groove, respectively, and the rotating handle is rotatably connected in the corresponding receiving groove.

Optionally, two blocking bars are provided in the receiving groove, and the rotating handle is connected between the two blocking bars.

Optionally, a middle of a top end of the rotating handle is provided with an arc-shaped surface and an outer edge of the top end of the rotating handle is provided with a rounded corner.

Optionally, two opposite side walls of the tooth groove are provided with a vertical surface and an inclined surface respectively, an angle between the vertical surface and a bottom surface of the tooth groove is 90°, and an angle between the inclined surface and the bottom surface of the tooth groove is 15°-75°, and a geometric dimension of the bottom end of the pin is adapted to a geometric dimension of the tooth groove.

Optionally, a tension spring is connected between the first rack and a side of the base close to the vertical surface.

Optionally, a block is provided in a middle of the base.

Optionally, the base is provided with a scale at a place where the first paper blocking plate and the second paper blocking plate are in contact with each other, and an origin of the scale is arranged at a middle position of the block, and a distance between the first paper blocking plate and the second paper blocking plate is 20-84 mm.

Optionally, an outer side wall of the second paper blocking plate is inwardly concave and surrounded by a coil, and the outer side wall of the second paper blocking plate is connected to a coil cover plate, the coil is located between the coil cover plate and the second paper blocking plate, a side of the coil in contact with the second paper blocking plate is provided with an identification module, and a side of the coil extending from the second paper blocking plate is provided with a signal transmission module.

The present application provides an adjustable paper blocking structure of a thermal printer. The adjustable paper blocking structure can be applied to different sizes of label paper and improve printing accuracy. In use, the label paper is placed in the paper tray and the first paper blocking plate and the second paper blocking plate are adjusted according to the size of the label paper, so that the label paper is moved to the middle of the paper tray and the first paper blocking plate and the second paper blocking plate are in contact with both ends of the label paper. By adjusting the locking component connected to the first paper blocking plate, the bottom end of the pin on the locking component moves into the corresponding tooth groove. Under the action of the reset spring, the pin is locked in the tooth groove, which can fix the first paper blocking plate and the second paper blocking plate on the base and always lock the labels of different sizes in the middle of the paper tray, thereby avoiding position deviation during printing and improving printing accuracy.

The paper blocking structure of the present application further optimizes the structure of the tooth groove by providing a vertical surface and an inclined surface within the tooth groove. Additionally, a tension spring is placed between the first rack and the side of the base close to the vertical surface. The two paper blocking plates are designed as a linkage adjustment state through the ratchet, thereby allowing the user to quickly adjust the direction of the inclined surface, and when the two paper blocking plates are adjusted to match the size of the label paper, the spring can automatically lock the first paper blocking plate onto the vertical surface. Throughout the process, the user does not need to repeatedly adjust the position of the two paper blocking plates. By adjusting the first paper blocking plate, the second paper blocking plate will move the same distance in a linked motion, resulting in higher adjustment accuracy of the two paper blocking plates to the label paper. Furthermore, the vertical surface can prevent the two paper blocking plates from moving further inward, thereby avoiding direct pressure on the ends of the label paper and providing protection for the label paper.

DESCRIPTION OF DRAWINGS

In order to provide a clear explanation of the technical solutions in the present application or existing technologies, the following will briefly introduce the diagrams required for the embodiments. Apparently, the diagrams described below are only some embodiments of the present application. Those of ordinary skill in the art can obtain other diagrams based on these diagrams without creative labor.

In which: 1, base; 11, tooth groove; 111, inclined surface; 112, vertical surface; 12, first slot; 13, second slot; 14, block; 15, scale; 2, paper blocking component; 21, first paper blocking plate; 211, first convex platform; 212, receiving groove; 213, blocking bar; 22, second paper blocking plate; 221, second convex platform; 23, first rack; 24, second rack; 25, ratchet; 3, locking component; 31, rotating handle; 311, arc-shaped surface; 312, rounded corner; 32, pin; 33, reset spring; 34, tension spring; 4, coil; 41, identification module; 42, signal transmission module; 5, coil cover plate.

MODE FOR INVENTION

The following will describe the technical solution in a clear and complete manner, in conjunction with the accompanying drawings in the present application. Apparently, the described embodiment is only a part of the embodiments in the present application, not all of them. Based on the embodiments in the present application, all other embodiments obtained by ordinary skilled persons in the art belong to the scope of protection of the present application.

Figure 1:
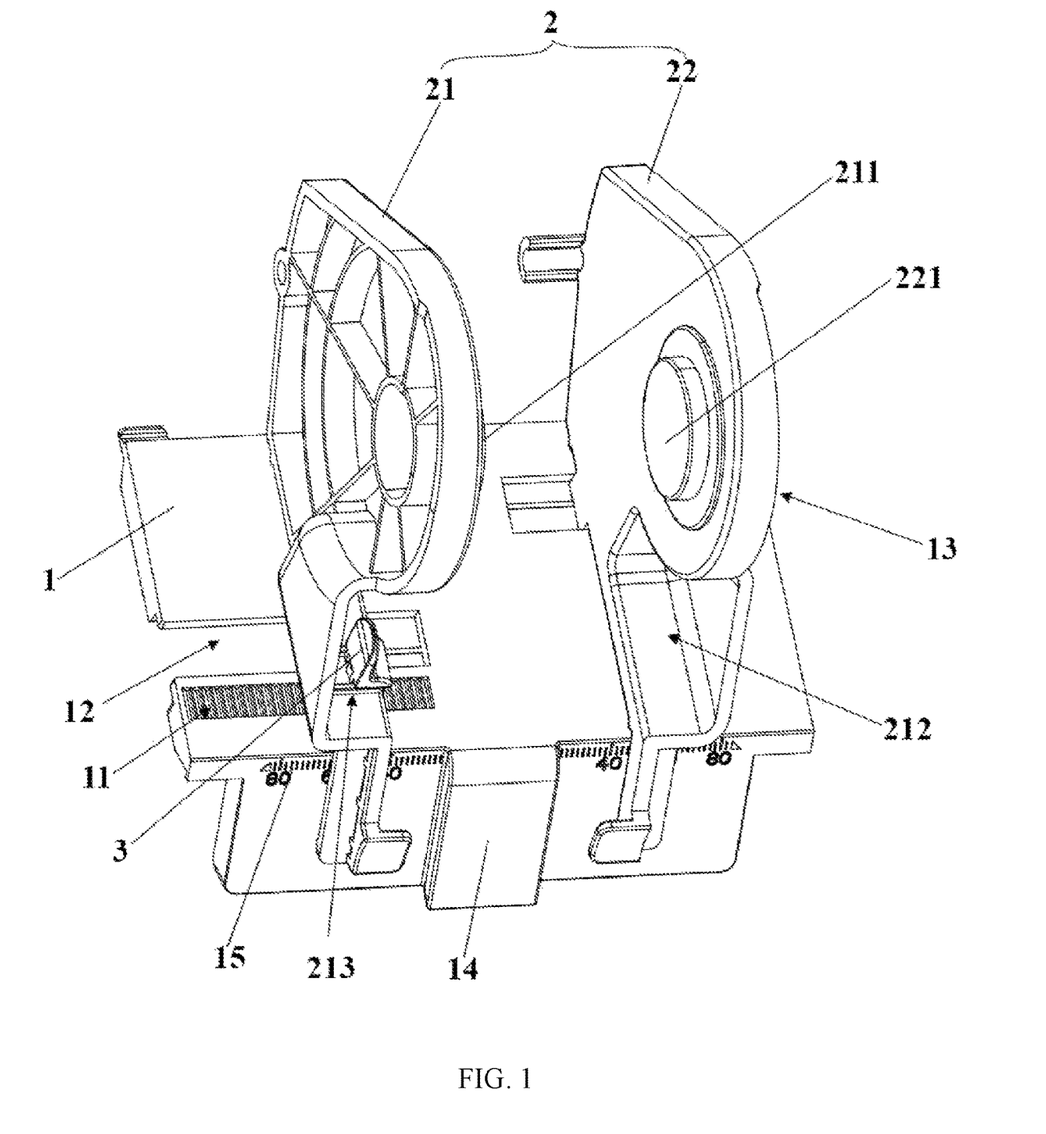
FIG. 1 is a schematic diagram of an adjustable paper blocking structure of a thermal printer described in an embodiment of the present application.
Figure 2:
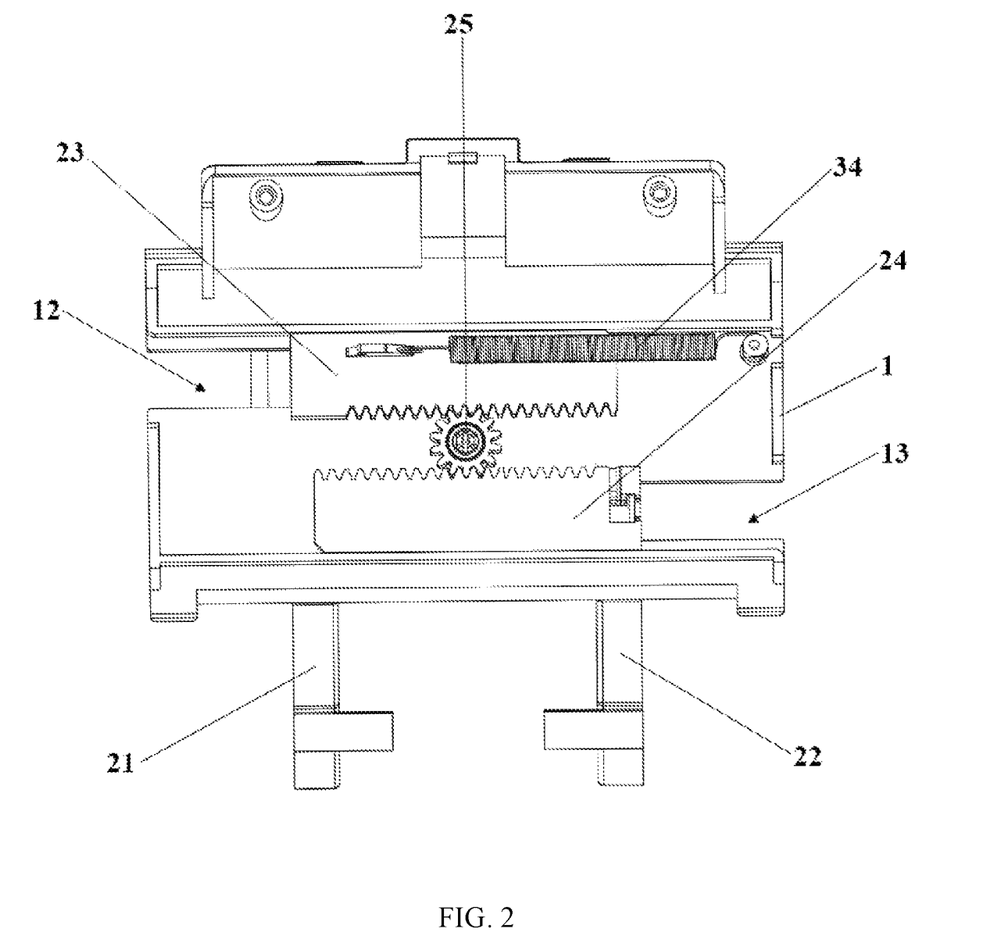
FIG. 2 is an installation schematic diagram of a paper blocking component in an adjustable paper blocking structure of a thermal printer described in an embodiment of the present application.
Figure 3:
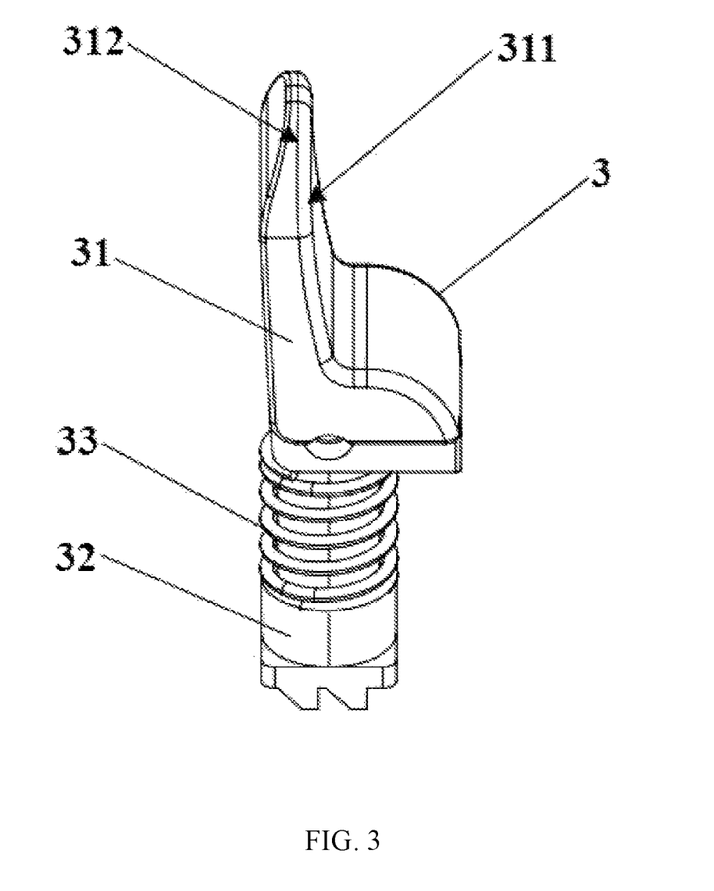
FIG. 3 is a schematic diagram of a locking component in an adjustable paper blocking structure of a thermal printer described in an embodiment of the present application.

As shown in FIGS. 1-2, in some implementations, the adjustable paper blocking structure of a thermal printer can be used in desktop thermal printers. The blocking structure includes a base 1, a paper blocking component 2, and a locking component 3. The paper blocking component 2 includes a first paper blocking plate 21 and a second paper blocking plate 22, which are mirror-symmetrically arranged on the base 1 and slidably connected to the base 1. The base 1 is provided with parallel first and second slots 12 and 13, and a plurality of parallel tooth grooves 111 can be arranged near the edge of the base 1 close to the first slot 12. The bottom ends of both the first and second paper blocking plates 21 and 22 are provided with first and second racks 23 and 24, respectively, which respectively pass through the first and second slots 12 and 13 and engage through the ratchet 25. The ratchet 25 is rotatably connected to the base 1, and the first paper blocking plate 21 can be adjusted in linkage with the second rack 24 through the first rack 23 and the ratchet 25. The locking component 3 includes a rotating handle 31, a pin 32, and a reset spring 33. The bottom end of the pin 32 passes through the bottom end of the first paper blocking plate 21 and slides in the tooth groove 11. The top end of the pin 32 passes through the top end of the first paper blocking plate 21 and is rotatably connected to the rotating handle 31. The middle of the pin 32 is fitted with the reset spring 33, and the top end of the reset spring 33 is connected to the bottom surface of the first paper blocking plate 21, while the bottom end of the reset spring 33 is connected to the side wall of the pin 32. In addition, an arc-shaped surface 311 is arranged in the middle of the top end of the rotating handle 31, and a rounded corner 312 is arranged on the outer edge of the top end of the rotating handle 31, which can make the surface of the rotating handle 31 smoother and improve the user experience.

When using, the user can first adjust the first paper blocking plate 21 and second paper blocking plate 22 to their maximum external positions, and then place the label paper into the paper tray of the desktop thermal printer. The first paper blocking plate 21 is driven to move inwards, and the first rack 23 at the bottom end of the first paper blocking plate 21 drives the second rack 24 as well as the second paper blocking plate 22 to move inwards through the ratchet 25. This causes the inner walls of the first paper blocking plate 21 and the second paper blocking plate 22 to respectively abut against both ends of the label paper. For label paper with different sizes, the user can adjust the first paper blocking plate 21, and the second paper blocking plate 22 will be adjusted in linkage so that the movement distance of the first paper blocking plate 21 and the second paper blocking plate 22 are always the same, and the movement directions are opposite, thereby the label paper with different sizes can be adjusted to the middle position of the paper tray. Once the label paper is in the middle position of the paper tray, the reset spring 33 in the locking component 3 will push the pin 32 downwards, the bottom end of the pin 32 is locked at the corresponding tooth groove 11, and both the first paper blocking plate 21 and the second paper blocking plate 22 are fixed on the base 1, which prevents the label paper from shifting to both sides, thereby ensuring that label paper with different sizes is always in the best printing position, and ensuring printing accuracy. In addition, if the size of the label paper changes, the user can adjust the positions of the first paper blocking plate 21 and the second paper blocking plate 22 by simply turning the rotating handle 31 upwards, the reset spring 33 will release the pin 32 from the tooth groove 11, allowing the first paper blocking plate 21 and the second paper blocking plate 22 to resume movement and move to the position that matches the size of the label paper, and then lock in the corresponding tooth groove 11, thus making it suitable for label paper with different sizes.

As shown in FIGS. 1-6, the present application can further improve the following technical solution.

In one embodiment, the first convex platform 211 is located in the middle of the inner wall of the first paper blocking plate 21, and the second convex platform 221 is located in the middle of the inner wall of the second paper blocking plate 22. The two convex platforms can limit both ends of the label paper. Two blocking bars 213 are arranged in the receiving groove 212, and the rotating handle 31 is partially rotatably connected between the two blocking bars 213.

In this embodiment, the label paper can be rolled into a cylindrical shape, with two round holes formed at both ends of the label paper. The first convex platform 211 and the second convex platform 221 can be inserted into the corresponding round holes, which can further limit the vertical direction of the label paper to prevent it from jumping up and down, thereby making the printing more uniform and ensuring printing effect. In addition, the two blocking bars 213 in the receiving groove 212 can guide the rotation of the rotating handle 31, thereby avoiding the rotating handle 31 from deviating during rotation, making the connection between the first paper blocking plate 21 and the base 1 more secure, and further preventing the label paper from shifting position.

Figure 4:
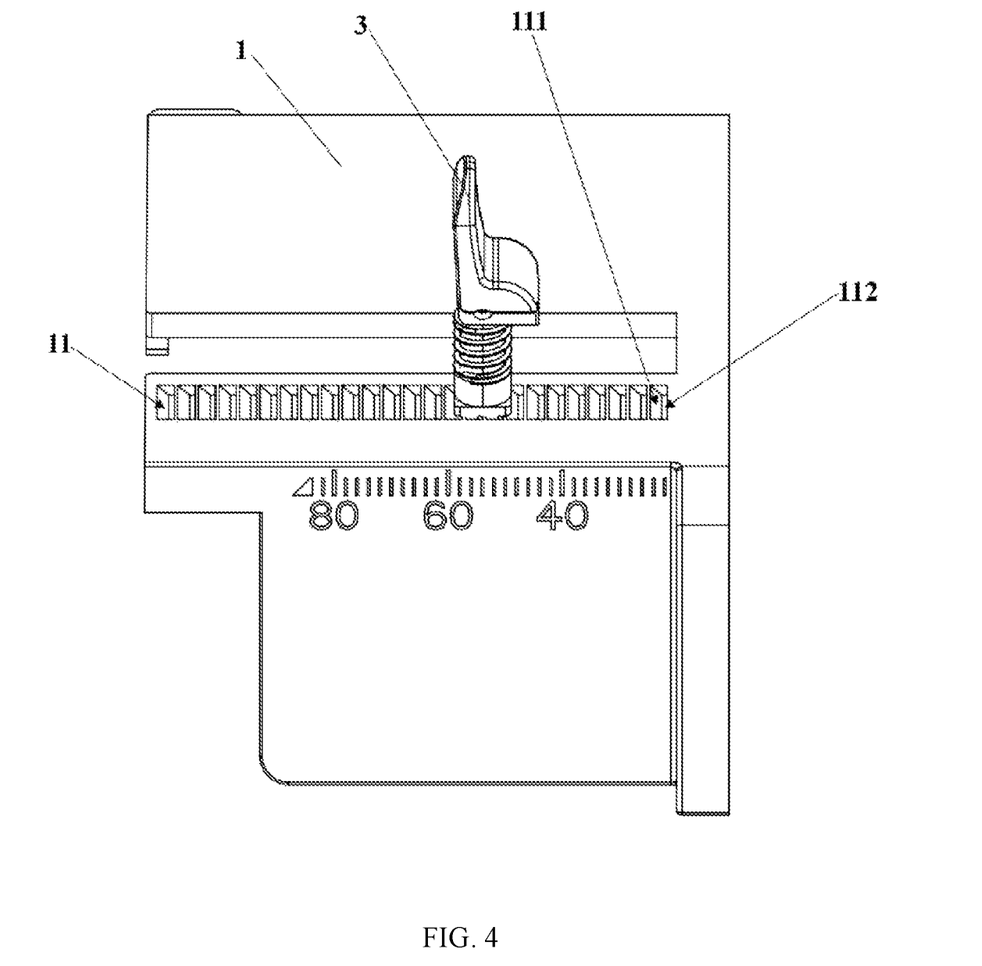
FIG. 4 is an enlarged partial view of a tooth groove in an adjustable paper blocking structure of a thermal printer described in an embodiment of the present application.

In one embodiment, the two opposite side walls of the tooth groove 11 are respectively provided with the vertical surface 112 and the inclined surface 111. The angle between the vertical surface 112 and the bottom surface of the tooth groove 11 is 90°, and the angle between the inclined surface 111 and the bottom surface of the tooth groove 11 is 15°-75°. The geometric dimensions of the bottom end of pin 32 are adapted to the geometric dimensions of the tooth groove 11.

A tension spring 34 is connected between the first rack 23 and the side of the base 1 near the vertical surface 112. A block 14 is provided in the middle of the base 1.

In this embodiment, the vertical surface 112 and inclined surface 111 are arranged inside the tooth groove 11. A tension spring 34 is arranged between the first rack 23 and the side of the base 1 near the vertical surface 112. The two paper blocking plates are designed to be in a linkage adjustment state by means of the ratchet 25, thereby allowing the user to quickly adjust the direction of the inclined surface 111. When the two paper blocking plates are adjusted to the position matching the label paper specifications, the tension spring 34 can automatically lock the first paper blocking plate 21 on the vertical surface 112. Throughout the process, the user does not need to repeatedly adjust the position of the two paper blocking plates, only needs to adjust the first paper blocking plate 21, and the second paper blocking plate 22 will move in the same distance in linkage, thereby making the adjustment accuracy of the two paper blocking plates higher, and the automatic locking function of the tension spring 34 can save effort. The block 14 can create a distance between the first paper blocking plate 21 and the second paper blocking plate 22, making it easier for the user to adjust the movement position of the two paper blocking plates.

The angle between the vertical surface 112 and the bottom surface of the tooth groove 11 is designed to be 90°, so that when the tension spring 34 pulls the first paper blocking plate 21 inward, the vertical surface 112 can exert a force of the same magnitude and opposite direction on the first paper blocking plate 21, causing the first paper blocking plate 21 to automatically lock at the vertical surface 112. The angle between the inclined surface 111 and the bottom surface of the tooth groove 11 is 15°-75°, preferably 45° between the two surfaces, which allows the user to apply less force when pushing the first paper blocking plate 21 to the outside, thus saving effort. In one embodiment, the base 1 is provided with a scale 15 at a place where the first paper blocking plate 21 and the second paper blocking plate 22 are in contact with each other. The origin of the scale 15 is arranged in the middle of the block 14, and the distance between the first paper blocking plate 21 and the second paper blocking plate 22 is 20-84 mm.

The scale 15 in this embodiment can make the movement position of the first paper blocking plate 21 and the second paper blocking plate 22 more accurate, which is convenient for the subsequent use and maintenance of the thermal printer. The distance between the first paper blocking plate 21 and the second paper blocking plate 22 is 20-84 mm, which makes the adjustable paper blocking structure of a thermal printer applicable to 77.78% of the label paper on the market.

Figure 5:
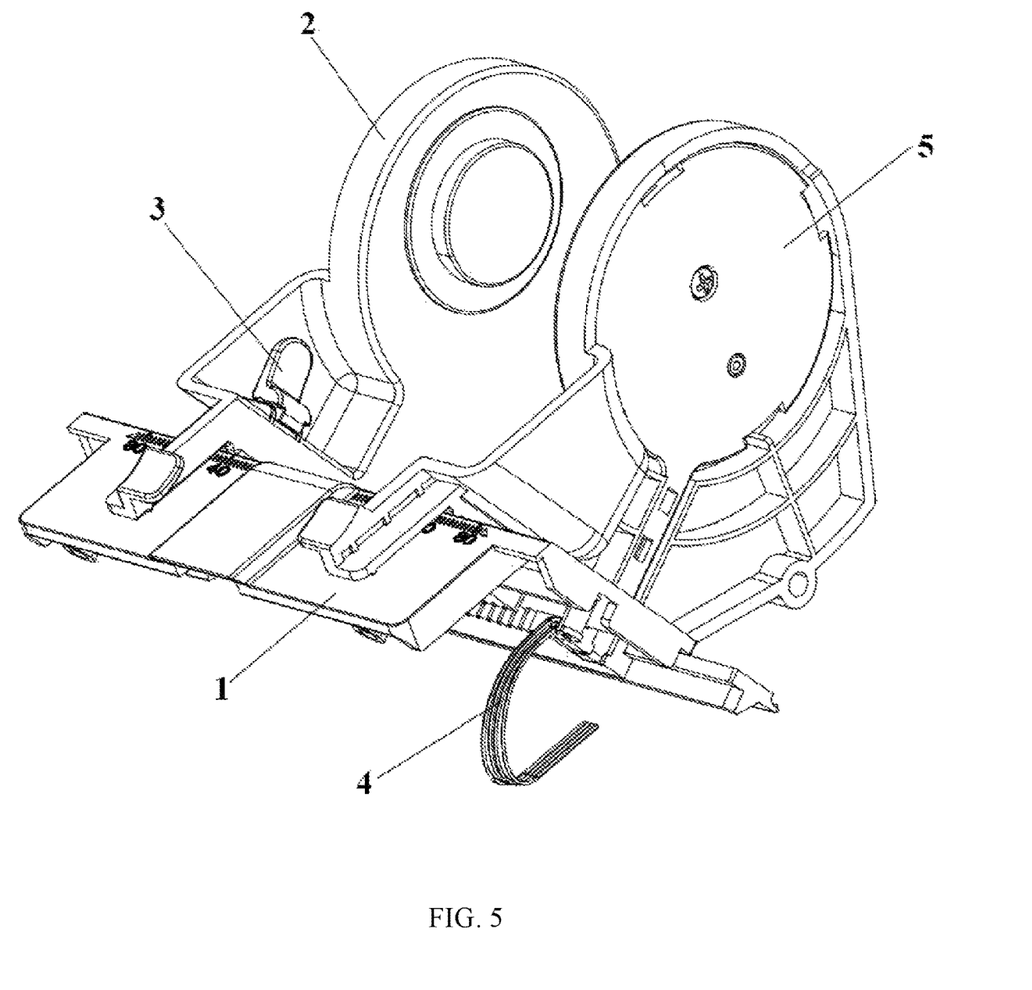
FIG. 5 is an installation schematic diagram of a coil and a coil cover plate in an adjustable paper blocking structure of a thermal printer described in an embodiment of the present application.
Figure 6:
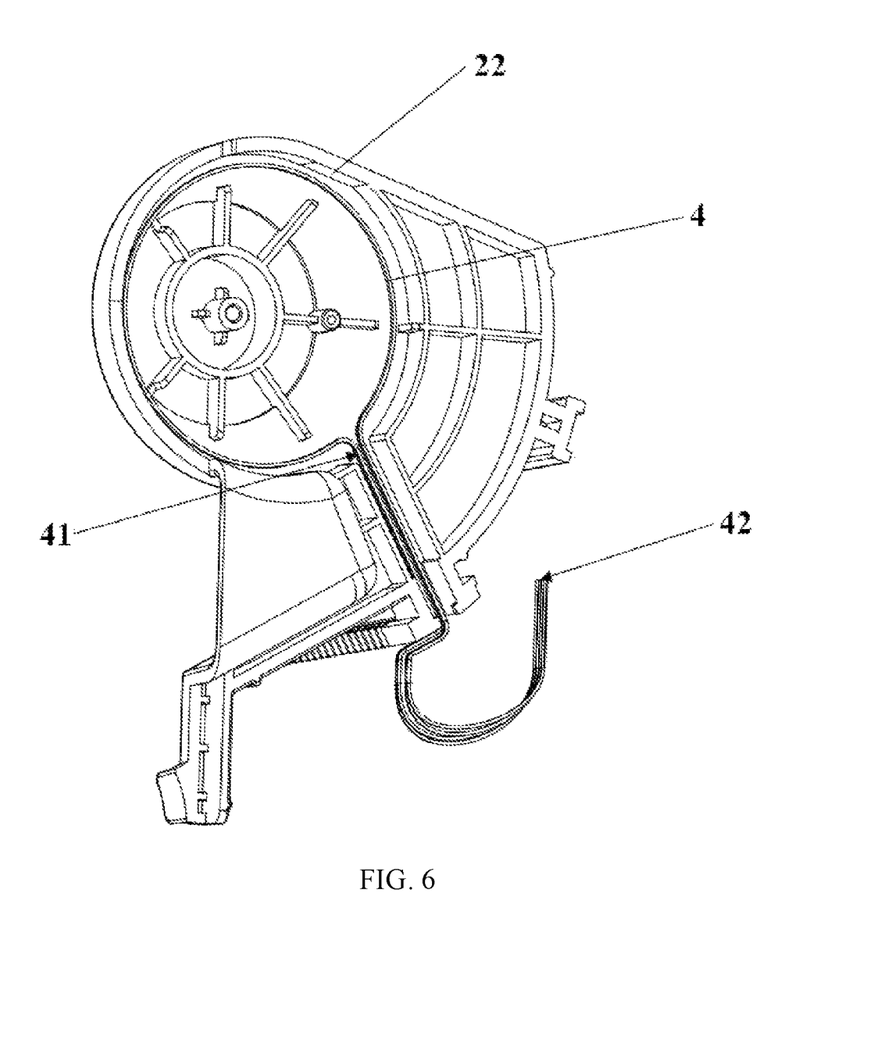
FIG. 6 is an installation schematic diagram of a coil in an adjustable paper blocking structure of a thermal printer described in an embodiment of the present application.

In one embodiment, the outer side wall of the second paper blocking plate 22 is recessed inwardly, and a coil 4 can be wrapped around the outer side wall of the second paper blocking plate 22. The coil 4 is packed between the second paper blocking plate 22 and the coil cover plate 5. An identification module 41 is provided on the side of the coil 4 that contacts with the second paper blocking plate 22, and a signal transmission module 42 is provided on the side of the coil 4 that extends from the second paper blocking plate 22, thereby being capable of recognizing input information on the label and wirelessly transmitting the information to the external environment.

In this embodiment, specification information is stored on the label paper, which can be recognized by the identification module 41 in the coil 4, and the specification information can be wirelessly transmitted to the external environment through the signal transmission module 42, thereby allowing users to quickly identify label paper information and facilitating the use, maintenance, and debugging of equipment.

In the above embodiments, each embodiment is described with a specific focus, and parts not detailed in one embodiment may be found in the relevant descriptions of other embodiments.

It should be understood in the description of the present application that the orientation or positional relationship indicated is based on the orientation or positional relationship shown in the drawings, which is only for the purpose of facilitating the description and simplifying the description of the present application. It does not indicate or imply that the device or component referred to must have a specific orientation, be constructed and operated in a specific orientation. Therefore, it should not be understood as limiting the scope of the present application.

In the description of the present application, unless otherwise explicitly specified and limited, for example, it can be fixedly connected or detachably connected, or integrated; it can be mechanically connected or electrically connected; it can be directly connected or indirectly connected through an intermediate medium. It can be the interconnection between two components or the interaction between two components, unless otherwise explicitly limited. For those skilled in the art, the above terms can be understood according to specific situations in the present application.

It should be noted that in the description of the present application, relationship terms such as "first" and "second" are used only to distinguish one entity or operation from another, and do not necessarily require or imply any actual relationship or order between these entities or operations. In addition, terms such as "including", "comprising" or any other variants thereof are intended to encompass non-exclusive inclusion, such that processes, methods, items, or devices comprising a series of elements not only include those elements, but also include other elements not explicitly listed, or include elements inherently associated with such processes, methods, items, or devices. Unless otherwise limited, elements that are limited by the phrase "including a . . . " do not exclude other identical elements in the process, method, item, or device that includes the specified elements.

The above-described embodiments provide a detailed description of the solutions provided in the present application. Specific examples are used to describe the principles and implementation methods of the present application. The description of the embodiments is only intended to assist in understanding the method and core ideas of the present application. For those skilled in the art, changes in specific implementation methods and application scope will be made based on the ideas of the present application. Therefore, the contents of this specification should not be understood as limiting the scope of the present application.

What is claimed is:

1. An adjustable paper blocking structure of a thermal printer, comprising:
   a base evenly provided with a plurality of tooth grooves;
   a paper blocking component comprising a first paper blocking plate and a second paper blocking plate, wherein the first paper blocking plate and the second paper blocking plate are mirror-symmetrically arranged on the base and slidably connected to the base;
   a locking component having one end rotatably connected to the first paper blocking plate and the other end engaged in the corresponding tooth groove;
   wherein the base is provided with a first slot and a second slot, and a bottom end of the first paper blocking plate and a bottom end of the second paper blocking plate are respectively provided with a first rack and a second rack, the first rack and the second rack pass through the first slot and the second slot respectively and are engaged by a ratchet, the ratchet is rotatably attached to the base;
   wherein the locking component comprises a rotating handle, a pin, and a reset spring, a bottom end of the pin passes through the bottom end of the first paper blocking plate and is slidably connected to the tooth groove, a top end of the pin passes through a top end of the first paper blocking plate and is rotatably connected to the rotating handle, a middle of the pin is fitted with the reset spring, and a top end of the reset spring is connected to a bottom surface of the first paper blocking plate and a bottom end of the reset spring is connected to a side wall of the pin.

2. The adjustable paper blocking structure of a thermal printer of claim 1, wherein a first convex platform and a second convex platform are provided in a middle of an inner wall of the first paper blocking plate and in a middle of an inner wall of the second paper blocking plate, respectively.

3. The adjustable paper blocking structure of a thermal printer of claim 2, wherein a lower side of the inner wall of the first paper blocking plate and a lower side of the inner wall of the second paper blocking plate are provided with a receiving groove, respectively, and the rotating handle is rotatably connected in the corresponding receiving groove.

4. The adjustable paper blocking structure of a thermal printer of claim 3, wherein two blocking bars are provided in the receiving groove, and the rotating handle is connected between the two blocking bars.

5. The adjustable paper blocking structure of a thermal printer of claim 1, wherein a middle of a top end of the rotating handle is provided with an arc-shaped surface and an outer edge of the top end of the rotating handle is provided with a rounded corner.

6. The adjustable paper blocking structure of a thermal printer of claim 1, wherein two opposite side walls of the tooth groove are provided with a vertical surface and an inclined surface respectively, an angle between the vertical surface and a bottom surface of the tooth groove is 90°, and an angle between the inclined surface and the bottom surface of the tooth groove is 15°-75°, and a geometric dimension of the bottom end of the pin is adapted to a geometric dimension of the tooth groove.

7. The adjustable paper blocking structure of a thermal printer of claim 6, wherein a tension spring is connected between the first rack and a side of the base close to the vertical surface.

8. The adjustable paper blocking structure of a thermal printer of claim 1, wherein a block is provided in a middle of the base.

9. The adjustable paper blocking structure of a thermal printer of claim 8, wherein the base is provided with a scale at a place where the first paper blocking plate and the second paper blocking plate are in contact with each other, and an origin of the scale is arranged at a middle position of the block, and a distance between the first paper blocking plate and the second paper blocking plate is 20-84 mm.

10. The adjustable paper blocking structure of a thermal printer of claim 1, wherein an outer side wall of the second paper blocking plate is inwardly concave and surrounded by a coil, and the outer side wall of the second paper blocking plate is connected to a coil cover plate, the coil is located between the coil cover plate and the second paper blocking plate, a side of the coil in contact with the second paper blocking plate is provided with an identification module, and a side of the coil extending from the second paper blocking plate is provided with a signal transmission module.

* * * * *